United States Patent
Srinivasan et al.

(10) Patent No.: US 12,244,518 B2
(45) Date of Patent: Mar. 4, 2025

(54) NETWORK-ON-CHIP ARCHITECTURE FOR HANDLING DIFFERENT DATA SIZES

(71) Applicant: Xilinx, Inc., San Jose, CA (US)

(72) Inventors: Krishnan Srinivasan, San Jose, CA (US); Sagheer Ahmad, Cupertino, CA (US); Ygal Arbel, Morgan Hill, CA (US); Aman Gupta, Sunnyvale, CA (US)

(73) Assignee: Xilinx, Inc., San Jose, CA (US)

(*) Notice: Subject to any disclaimer, the term of this patent is extended or adjusted under 35 U.S.C. 154(b) by 303 days.

(21) Appl. No.: 17/663,376

(22) Filed: May 13, 2022

(65) Prior Publication Data

US 2023/0370392 A1 Nov. 16, 2023

(51) Int. Cl.
*H04L 49/109* (2022.01)

(52) U.S. Cl.
CPC .................. *H04L 49/109* (2013.01)

(58) Field of Classification Search
None
See application file for complete search history.

(56) References Cited

U.S. PATENT DOCUMENTS

| | | | |
|---|---|---|---|
| 3,776,137 A | 12/1973 | Abbott | |
| 4,876,641 A | 10/1989 | Cowley | |
| 5,848,264 A | 12/1998 | Baird et al. | |
| 6,090,156 A | 7/2000 | MacLeod | |
| 6,091,263 A | 7/2000 | New et al. | |
| 6,150,839 A | 11/2000 | New et al. | |
| 6,204,687 B1 | 3/2001 | Schultz et al. | |
| 6,462,579 B1 | 10/2002 | Camilleri et al. | |
| 6,526,557 B1 | 2/2003 | Young et al. | |
| 6,628,615 B1* | 9/2003 | Joseph | H04L 12/56 370/231 |
| 6,759,869 B1 | 7/2004 | Young et al. | |
| 6,810,514 B1 | 10/2004 | Alfke et al. | |
| 6,836,842 B1 | 12/2004 | Guccione et al. | |
| 6,907,595 B2 | 6/2005 | Curd et al. | |
| 7,024,651 B1 | 4/2006 | Camilleri et al. | |
| 7,057,413 B1 | 6/2006 | Young et al. | |
| 7,080,283 B1 | 7/2006 | Songer | |
| 7,124,338 B1 | 10/2006 | Mark et al. | |
| 7,182,006 B1 | 2/2007 | Wu | |
| 7,185,309 B1 | 2/2007 | Kulkarni | |
| 7,224,184 B1 | 5/2007 | Levi et al. | |

(Continued)

OTHER PUBLICATIONS

Cheng Li and P. Ampadu, "Energy-efficient NoC with variable channel width," 2015 IEEE 58th International Midwest Symposium on Circuits and Systems (MWSCAS), Fort Collins, CO, USA, 2015, pp. 1-4, doi: 10.1109/MWSCAS.2015.7282188. (Year: 2015).*

(Continued)

*Primary Examiner* — Lonnie V Sweet
(74) *Attorney, Agent, or Firm* — Kevin T. Cuenot

(57) ABSTRACT

An integrated circuit (IC) includes a Network-on-Chip (NoC). The NoC includes a plurality of NoC master circuits, a plurality of NoC slave circuits, and a plurality of switches. The plurality of switches are interconnected and communicatively link the plurality of NoC master circuits with the plurality of NoC slave circuits. The plurality of switches are configured to receive data of different widths during operation and implement different operating modes for forwarding the data based on the different widths.

17 Claims, 10 Drawing Sheets

(56) References Cited

U.S. PATENT DOCUMENTS

| | | |
|---|---|---|
| 7,281,093 B1 | 10/2007 | Kulkarni et al. |
| 7,302,625 B1 | 11/2007 | Payakapan et al. |
| 7,380,035 B1 | 5/2008 | Donlin |
| 7,394,288 B1 | 7/2008 | Agarwal |
| 7,454,658 B1 | 11/2008 | Baxter |
| 7,477,072 B1 | 1/2009 | Kao et al. |
| 7,478,357 B1 | 1/2009 | Mason et al. |
| 7,482,836 B2 | 1/2009 | Levi et al. |
| 7,500,060 B1 | 3/2009 | Anderson et al. |
| 7,509,617 B1 | 3/2009 | Young |
| 7,518,396 B1 | 4/2009 | Kondapalli et al. |
| 7,521,961 B1 | 4/2009 | Anderson |
| 7,546,572 B1 | 6/2009 | Ballagh et al. |
| 7,574,680 B1 | 8/2009 | Kulkarni et al. |
| 7,619,442 B1 | 11/2009 | Mason et al. |
| 7,640,527 B1 | 12/2009 | Dorairaj et al. |
| 7,650,248 B1 | 1/2010 | Baxter |
| 7,724,815 B1 | 5/2010 | Raha et al. |
| 7,746,099 B1 | 6/2010 | Chan et al. |
| 7,788,625 B1 | 8/2010 | Donlin et al. |
| 7,831,801 B1 | 11/2010 | Anderson |
| 8,006,021 B1 | 8/2011 | Li et al. |
| 8,020,163 B2 | 9/2011 | Nollet et al. |
| 8,045,546 B1 | 10/2011 | Bao et al. |
| 8,102,188 B1 | 1/2012 | Chan et al. |
| 8,214,694 B1 | 7/2012 | McKechnie et al. |
| 8,250,342 B1 | 8/2012 | Kostarnov et al. |
| 8,359,448 B1 | 1/2013 | Neuendorffer |
| 8,415,974 B1 | 4/2013 | Lysaght |
| 8,719,750 B1 | 5/2014 | Balzli, Jr. |
| 8,719,808 B1 | 5/2014 | Prinzing |
| 8,796,539 B2 | 8/2014 | Asaumi et al. |
| 8,928,351 B1 | 1/2015 | Konduru |
| 9,081,634 B1 | 7/2015 | Simkins et al. |
| 9,218,443 B1 | 12/2015 | Styles et al. |
| 9,436,785 B1 | 9/2016 | Javre et al. |
| 9,578,099 B2 | 2/2017 | Llorca et al. |
| 9,722,613 B1 | 8/2017 | Schultz et al. |
| 10,243,882 B1 | 3/2019 | Swarbrick et al. |
| 10,252,011 B2 | 4/2019 | Garde et al. |
| 2004/0114609 A1 | 6/2004 | Swarbrick et al. |
| 2004/0210695 A1 | 10/2004 | Weber et al. |
| 2007/0006137 A1 | 1/2007 | Savagaonkar et al. |
| 2008/0082759 A1 | 4/2008 | Pong |
| 2008/0320255 A1 | 6/2008 | Wingard |
| 2008/0320268 A1 | 6/2008 | Wingard |
| 2010/0322237 A1 | 12/2010 | Raja |
| 2012/0036296 A1 | 2/2012 | Chou |
| 2012/0310983 A1 | 8/2012 | Mittal |
| 2014/0177648 A1* | 6/2014 | Kumar .............. H04L 49/25 370/468 |
| 2014/0204740 A1* | 7/2014 | Tokutsu .............. H04L 47/52 370/230 |
| 2015/0010005 A1* | 1/2015 | Yoshida .............. H04L 45/74 370/392 |
| 2017/0140800 A1 | 5/2017 | Wingard et al. |
| 2017/0195258 A1 | 7/2017 | Wang et al. |
| 2017/0220499 A1 | 8/2017 | Gray |
| 2017/0315944 A1 | 11/2017 | Mayer et al. |
| 2023/0236992 A1* | 7/2023 | Bruce .............. G06F 13/16 710/306 |

OTHER PUBLICATIONS

Min Chae Yang, et al., MRBS: An Area-Efficient Multicast Router for Network-on-Chip using Buffer Sharing, IEEE Access, vol. 4, 2016, 11 pages.

Reetuparna Das et al: "Design and evaluation of a hierarchical onchip interconnect for next-generation CMPs", High Performance Computer Architecture, 2009. HPCA 2009. IEEE 15th International Symposium on, IEEE, Piscataway, NJ, USA, Feb. 14, 2009 (Feb. 14, 2009), pp. 175-186.

Cheng Li et al: "Energy-efficient NoC with variable channel width", 2015 IEEE 58th International Midwest Symposium on Circuits and Systems (MWSCAS), IEEE, Aug. 2, 2015 (Aug. 2, 2015), pp. 1-4.

Chris Fallin, et al., CHIPPER: A Low-complexity Bufferless Deflection Router, Computer Architecture Lab (CALCM) Carnegie Mellon University, Proceedings of the IEEE International Symposium on High Performance Computer Architecture (HPCA), 2011, 13 pages.

Nachiket Kapre, et al., Hoplite: A Deflection-Routed Directional Torus NoC for FPGAs, ACM Transactions on Reconfigurable Technology and Systems, vol. 1, No. 2, Article 3, Publication date: Apr. 2016, 24 pages.

Xilinx, SmartConnect v1.0, LogiCORE IP Product Guide, Vivado Design Suite PG247, Feb. 3, 2020, 55 pages.

Kapre, N. et al., "Hoplite: Building Austere Overlay NoCs for FPGAs," retrieved from the Internet: <https://fpga.org/wp-content/uploads/2015/09/hoplite_fpl2015.pdf>, retrieved Sep. 24, 2024, 8 pg.

* cited by examiner

NETWORK-ON-CHIP ARCHITECTURE FOR HANDLING DIFFERENT DATA SIZES

TECHNICAL FIELD

This disclosure relates to integrated circuits (ICs) and, more particularly, to a Network-on-Chip (NoC) architecture within an IC that is capable of handling different data sizes.

BACKGROUND

A Network-on-Chip (NoC) refers to a network-based communication subsystem implemented in an integrated circuit (IC). A NoC is capable of transferring data between different data producer circuits and data consumer circuits implemented within the IC. A NoC is often implemented in the IC using a plurality of interconnected router circuits, e.g., switches, where each router circuit is capable of performing packet switching operations to move data between the data producer and data consumer circuits.

SUMMARY

In one or more example implementations, an integrated circuit (IC) includes a Network-on-Chip (NoC). The NoC includes a plurality of NoC master circuits, a plurality of NoC slave circuits, and a plurality of switches. The plurality of switches are interconnected and communicatively link the plurality of NoC master circuits with the plurality of NoC slave circuits. The plurality of switches are configured to receive data of different widths during operation and implement different operating modes for forwarding the data based on the different widths.

In one or more example implementations, a method includes receiving data in a switch of the NoC. The method includes determining, using the switch, a width of the data. The method includes implementing, using the switch, a selected operating mode for processing the data based on the width. The selected operating mode is selected from a plurality of different operating modes. The method includes passing the data via the switch using the selected operating mode.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
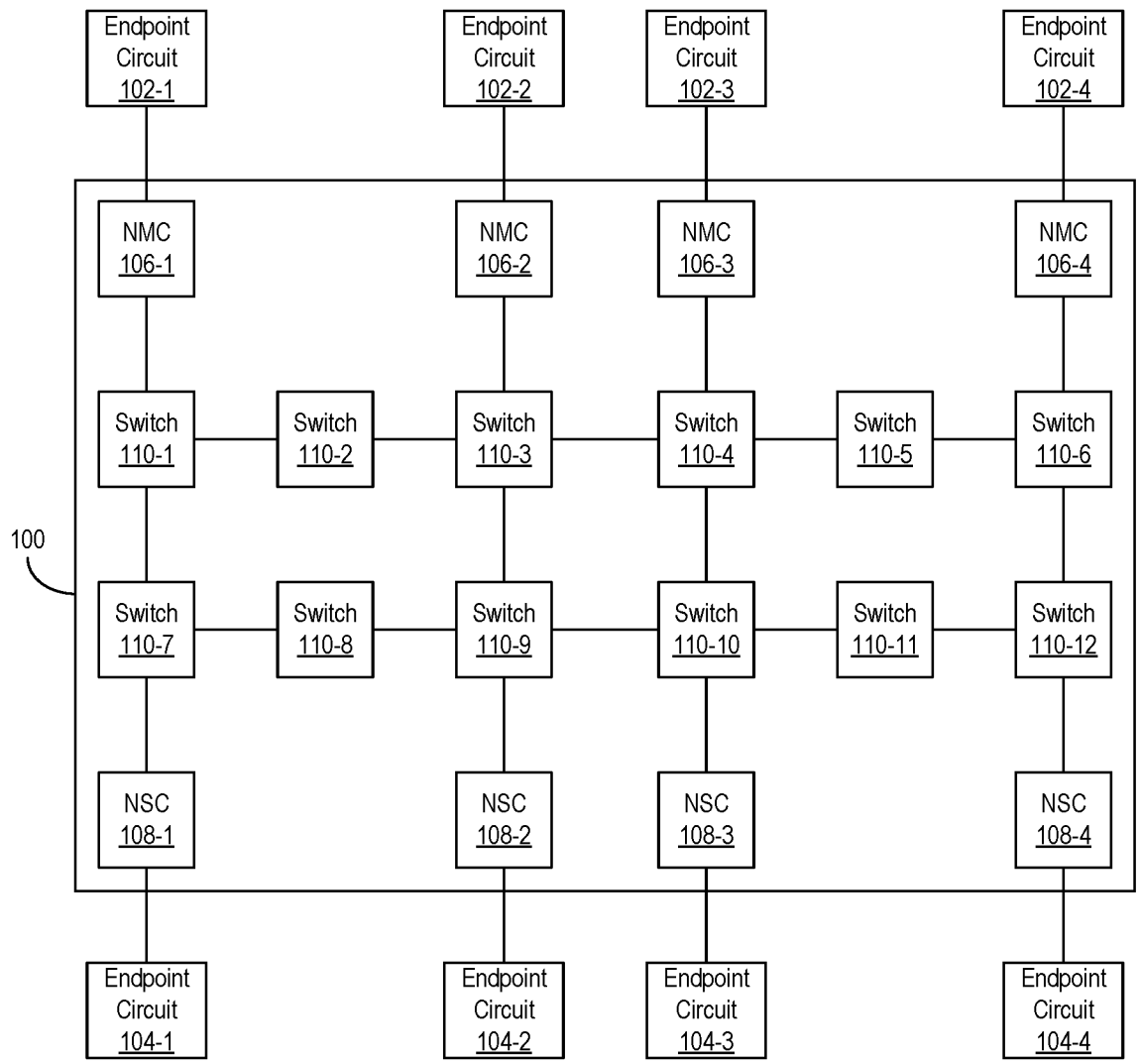
FIG. 1 illustrates an example of a Network-on-Chip (NoC) that may be implemented within an integrated circuit (IC).

This disclosure relates to integrated circuits (ICs) and, more particularly, to a Network-on-Chip (NoC) architecture within an IC that is capable of handling different data sizes. In one aspect, different flit sizes of the data may be dynamically scalable during operation of the NoC. That is, the NoC is capable of concurrently handling and routing data of different sizes during operation, e.g., in real-time. A "flit" of data refers to a flow control unit, which is a link-level atomic piece of information. A packet, for example, is formed of a plurality of flits. A flit of data is typically sent as a plurality of parallel, e.g., synchronized, bits.

NoCs are capable of transferring data between data producer circuits and data consumer circuits in an IC. Within this disclosure, the term "endpoint circuit" may be used to refer to a data producer circuit and/or a data consumer circuit. A NoC may be communicatively linked to various endpoint circuits by way of certain interface circuits through which data enters and exits the NoC. These interface circuits are connected to a plurality of switch circuits. In general, data enters the NoC from a data producer circuit by way of a first interface circuit, is routed using the switch circuits to a second interface through which the data exits the NoC, and is conveyed from the second interface circuit to a data consumer circuit. In conventional NoCs, the connections between the interface circuits and switch circuits and among switch circuits themselves are typically fixed in terms of width and, as such, operate with a single, predetermined data width.

As an example, a conventional NoC may be implemented with a data width of 128 bits. In this example, each interface circuit and switch circuit is configured to convey portions of data referred to as "flits." To traverse the NoC, each flit is created to be the same size. That is, if the NoC is configured to operate with a 128-bit width, each flit must be 128-bits in width. The NoC is unable to convey flits of data of different sizes. In cases where flits of data are of different widths than supported by the NoC, such flits are width converted by the interface circuits to a width that is supported by the NoC. For example, a 256-bit flit would be converted into two 128-bit flits. These two 128-bit flits would traverse the NoC independently as two unrelated 128-bit flits.

Some conventional NoCs are capable of conveying flits of data of two different widths. In such cases, however, the NoC is bifurcated into different partitions where each partition is configured to convey only flits of data of a particular width. This means that flits of data of the first width stay within a first partition of the NoC that is configured to convey flits of the first width, while flits of data of the second width stay within a second partition of the NoC that is configured to convey flits of the second width. The only way in which a flit may cross from one partition of the NoC to another partition is for the NoC to include data width conversion circuits disposed between the two bifurcated partitions. For a flit to move from one partition of the NoC to another partition, the flit must be width converted.

In accordance with the inventive arrangements described herein, a NoC is disclosed that is capable of transferring data including flits of different widths. That is, the NoC includes circuit nodes that are capable of automatically determining the width of a received flit. In certain aspects, the NoC circuit nodes, in response to determining the width of the flit, are capable of dynamically adjusting to the detected width by implementing a particular operating mode that is adapted to the determined width of the flit. The NoC circuit nodes are capable of forwarding the flit onward to a next circuit node of the NoC. The NoC circuit nodes may dynamically change between the different operating modes on a per-flit basis so that flits of different sizes may be handled concurrently by the NoC without using width conversion circuits and/or bifurcation of the NoC. Thus, any given switch circuit of the NoC may handle flits of data of different sizes (e.g., widths).

In one or more other example implementations, switches of the NoC may include configuration registers that may be programmed to place certain ports of the switch into different operating modes. The particular operating mode into which a given port of a switch is placed depends on the value programmed into the configuration register that controls that port and the width of the data that is to be processed or handled by the port. Whether the width of the flits is determined by way of flags or indicators included within the flits themselves or using configuration registers, it should be appreciated that the inventive arrangements contemplate a switch circuit having one or more ports operating in a first operating mode conveying flits of a first size concurrently with one or more other ports of the switch operating in a second operating mode conveying flits of a second and different size. Further aspects of the inventive arrangements are described below with reference to the figures.

FIG. 1 illustrates an example of a NoC 100 that may be implemented within an IC. NoC 100 is capable of conveying data between endpoint circuits 102 (e.g., 102-1, 102-2, 102-3, and/or 102-4) and endpoint circuits 104 (e.g., 104-1, 104-2, 104-3, and/or 104-4). In the example, for purposes of illustration, endpoint circuits 102 may represent data producer circuits while endpoint circuits 104 may represent data consumer circuits.

NoC 100 includes a plurality of NoC Master Circuits (NMCs) 106 (e.g., 106-1, 106-2, 106-3, and 106-4), a plurality of NoC slave circuits (NSCs) 108 (e.g., 108-1, 108-2, 108-3, and 108-4), and a plurality of switches 110 (e.g., 110-1, 110-2, 110-3, 110-4, 110-5, 110-6, 110-7, 110-8, 110-9, 110-10, 110-11, and 110-12). In the example, the NMCs 106 and the NSCs 108 are examples of interface circuits through which data may enter the NoC 100 and/or exit the NoC 100. Appreciably, each NMC 106 and each NSC 108 may be implemented as a two-way interface allowing data to enter and exit NoC 100. In general, NMCs 106 are examples of interfaces that are capable of receiving data from endpoint circuits 102 while NSCs 108 are examples of interfaces that are capable of outputting data to endpoint circuits 104. Appreciably, each NMC 106 and each NSC 108 may be implemented as a two-way interface thereby allowing endpoint circuits 104 to respond to endpoint circuits 102 (e.g., such that data may enter and exit NoC 100 via each NMC 106 and/or NSC 108).

In the example, each switch 110 may be connected to an adjacent circuit of NoC 100 in the up (north), left (west), right (east), and down (south) directions so long as such an adjacent circuit in NoC 100 exists. For example, switch 110-3 is capable of receiving data via any of the directions illustrated (e.g., from NMC 106-2, switch 110-2, switch 110-9, and/or switch 110-4) and routing or forwarding the received data to a circuit in any of the other 3 directions.

In the example, each NMC 106, NSC 108, and switch 110 is capable of receiving data having a first width and data having a second and different width. In the case of switches 110, data of different widths may be received by different ports of the switch serially or concurrently. In other cases, data of a first width may be received by a given port of the switch 110 immediately followed by data of a second and different width delivered to the same port of the switch 110 and/or to a different port.

In general, the NMCs 106, NSCs 108, and switches 110 are capable of operating in different operating modes. The operating mode implemented may be selected based on the size of the received data or data to be processed. In the example of FIG. 1, each different operating mode that may be implemented by the NMCs 106, NSCs 108, and switches 110 may be correlated to a particular data width. In one aspect, each switch 110 is capable of switching between these different operating modes dynamically, e.g., in real-time, during operation based on the size of the flit of data that is received by the respective circuit at any given time. This allows the architecture of NoC 100 to dynamically scale the flit-width of the channels of the NoC 100 based on the requested data-width and/or bandwidth of the requesting circuits (e.g., endpoint circuits 102). As such, NoC 100 is capable of supporting multiple different flit widths at full bandwidth.

The example of FIG. 1 illustrates an implementation that supports multiple, e.g., two or more, different data widths conveyed through NoC 100 concurrently at full bandwidth. A given switch 110, for example, is capable of conveying data of a first width from a selected port of the switch while conveying data of a different width from a different port of the switch. Similarly, a given switch 110, for example, is capable of conveying data of a first width from a selected port of the switch and subsequently convey data of a different width from the same port of the switch. NoC 100 is capable of routing mixed-mode data traffic (e.g., mixed in terms of widths) at full bandwidth.

In conventional NoC architectures that support data having fixed flit widths, the interfaces such as the NMCs and NSCs width convert any received data to ensure that the resulting data fits the fixed width of the NoC. In other conventional NoC architectures, larger flits of data may be forwarded as two smaller and independent flits of data concurrently (e.g., a 256-bit flit is sent as two independent 128-bit flits). This means that the two 128-bit flits, being considered independent within the conventional NoC as if from different packets may not travel together through the NoC as a unified portion of data despite being part of a same packet of data. This may lead to a deadlock condition where one-half of the data arrives prior to the other half of the data.

Figure 2:
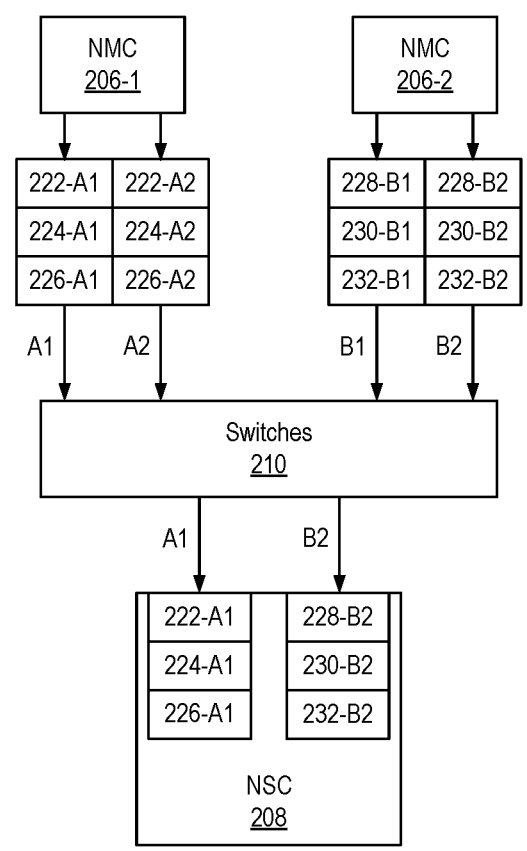
FIG. 2 illustrates an example of a deadlock condition that may occur in a conventional NoC.

FIG. 2 illustrates an example of a deadlock condition that may occur in a conventional NoC that is capable of sending a larger flit of data as two smaller flits of data concurrently. In the example of FIG. 2, NMC 206-1 forwards flits 222, 224, and 226 of data through switches 210 to NSC 208. Each of flits 222, 224, and 226 is forwarded to NSC 208 as two smaller and independent flits of data corresponding to a first portion A1 and a second portion A2. That is, regarding flit 222, the portion 222-A1 is forwarded as a first flit of half the size of flit 222, while the portion 222-A2 is forwarded as a second and independent flit of half the size of flit 222. The same is true of each of flits 224 and 226. NMC 206-2 forwards flits 228, 230, and 232 of data through switches 210 to NSC 208. Each of flits 228, 230, and 232 is forwarded to NSC 208 as two smaller and independent flits of data corresponding to a first portion B1 and a second portion B2 in the same manner as NSC 206. That is, regarding flit 228, the portion 228-B1 is forwarded as a first flit of half the size of flit 228, while the portion 228-B2 is forwarded as a second and independent flit of half the size of flit 228. The same is true of each of flits 230 and 232.

As shown, in some cases, due to the data routing priorities observed by switches 210, only the first portions A1 of flits 222, 224, and 226 arrive and the second portions B2 of flits 228, 230, and 232 arrive in NSC 208 thereby filling the two available buffers. Because the first-in-first-out (FIFO) memory buffers of NSC 208 have filled, a deadlock condition arises since there is no space to receive the second portions A2 of flits 222, 224, and 226 or the first portions B1 of flits 228, 230, and 232 to be able to output a complete flit (formed of A1 and A2, or of B1 and B2). The operation of NSC 208 effectively freezes and is unable to process further data.

Figure 3:
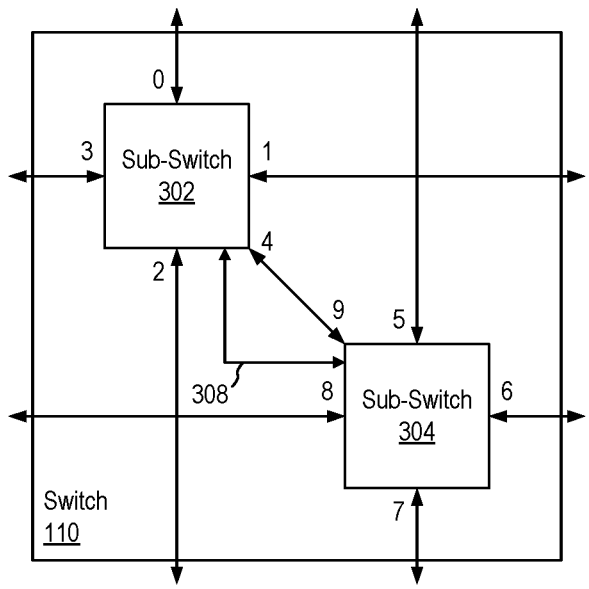
FIG. 3 illustrates an example implementation of a switch of a NoC in accordance with the inventive arrangements described herein.

FIG. 3 illustrates an example implementation of a switch 110 of FIG. 1. The view illustrated in FIG. 3 has been simplified for purposes of illustration. In the example of FIG. 3, switch 110 includes a sub-switch 302 and a sub-switch 304. Sub-switch 302 includes ports 0, 1, 2, 3, and 4. Sub-switch 304 includes ports 5, 6, 7, 8, and 9. As pictured, port 4 of sub-switch 302 is connected to port 9 of sub-switch 304. In the example, the channel formed by ports 4 and 9 is capable of conveying flits of data of sized the same as flits of data conveyed by any one of ports 0-3 or 5-9. Sub-switches 302 and 304 are also connected via a synchronization channel 308 over which sub-switches 302 and 304 communicate to operate in coordination with one another. The connectivity between sub-switches 302 and 304 via ports 4 and 9 allows a flit of data to cross from one sub-switch to another. It should be appreciated that each of sub-switches 302, 304 may have fewer ports or more ports than shown. In some examples, each sub-switch 302, 304 includes one or more additional ports. Such additional ports may be one or more 3-dimensional ports that may be connected to other layers and/or circuitry above and/or below the particular layer of the IC in which sub-switches 302, 304 are implemented.

In general, switch 110 is capable of operating in a plurality of different operating modes. In a first operating mode of the different operating modes, switch 110 processes data of a first width. In the first operating mode, selected ports of sub-switches 302 and 304 are capable of operating independently of one another. In a second operating mode of the different operating modes, switch 110 processes data of a second width that is greater than the first width. In the second operating mode, selected ports of sub-switches 302 and 304 are capable of operating in a coordinated manner, e.g., as a pair.

As discussed, the first and second operating modes are employed to process flits of data of different widths. In general, the first operating mode processes flits of a first width wherein the first width corresponds, or is equal, to a width of sub-switch 302 (e.g., or of sub-switch 304). That is, the first width may be the width of port 0, 1, 2, 3, or 4. The second operating mode processes flits of a second and different width. The second width corresponds, or is equal, to a width of sub-switch 302 and a width of sub-switch 304 combined. That is, the second width may be the width of ports 0 and 5 combined, the width of ports 1 and 6 combined, etc.

While FIG. 3 is generally described in terms of switch 110 operating in a particular operating mode, it should be appreciated that the operating mode may be implemented for selected groups of ports. In terms of explaining the operation of switches 110, groups of complementary ports are formed of the ports of sub-switch 302 and the ports of sub-switch 304. For example, the groups of complementary ports that exist in switch 110 include the following pairs (0, 5), (1, 6), (2, 7), and (3, 8). The term "group of complementary ports," as defined herein, means a plurality of ports wherein the plurality includes one port of each sub-switch of the switch, where each port of the plurality of ports is configured to send data to a same destination outside of the switch and receive data from a same source outside of the switch. Referring the group of complementary ports 0, 5, for example, both ports are capable of receiving flits of data from a same source external to switch 110 from the north and of sending flits of data to a same destination outside of the switch 110 to the north. Similarly, referring to the group of complementary ports 2, 7, both ports are capable of receiving flits of data from a same source outside of the switch 110 from the south and sending flits of data out to a same destination outside of the switch 110 to the south.

It should be appreciated that while the examples described herein depict 2 sub-switches, the inventive arrangements are not intended to be so limited. In one or more other example implementations, each switch 110 may include more than 2 sub-switches. For example, each switch 110 may include 4 sub-switches. In another example, each switch 110 may include 8 sub-switches. Accordingly, rather than each group of complementary ports including only a pair of ports as in the example of FIG. 3, each group of complementary ports would include one port from each of the sub-switches. A complementary group of ports in the 4 sub-switch example will include 4 ports where one port of the complementary group is taken from each sub-switch. A complementary group of ports in the 8 sub-switch example will include 8 ports where one port of the complementary group is taken from each sub-switch.

In forming complementary ports, ports 4 and 9 are excluded. In the example of FIG. 3, ports 4 and 9 may be used to convey flits of data of the first or smaller size among sub-switches 302, 304. Ports 4 and 9 are not utilized to convey flits of data of the larger size.

For purposes of illustration, consider an example where each of ports 0, 1, 2, 3, 4, 5, 6, 7, 8, and 9 is a 128-bit port. Each of the ports may include additional signals for purposes of conveying control data, Quality of Service (QoS) data, bit-width, and the like. For ease of discussion, however, the width of the data portion of each flit of data is used to refer to the width of the ports of sub-switches 302, 304.

In the first operating mode, each port 0, 1, 2, 3, 4, 5, 6, 7, and 9 is capable of conveying 128-bit flits of data.

In one or more examples, in the first operating mode, for a selected group of complementary ports of sub-switch 302 and sub-switch 304, only one port of the selected group of complementary ports is capable of passing a single flit of data at a time. For example, given the selected group of complementary ports (2, 7), only port 2 or port 7 will output a 128-bit flit at a given time. Port 7 may pass a 128-bit flit of data in the following or next clock cycle.

In one or more other examples, in the first operating mode, for a selected group of complementary ports of the first sub-switch 302 and sub-switch 304, each port of the selected group of complementary ports is capable of passing a single flit of data as described or concurrently. For example, given the selected group of complementary ports (2, 7), both port 2 and port 7 are capable of outputting a 128-bit flit at the same time. In the first mode of operation, the flits output from ports 2 and 7 may be independent in that the flits belong to different packets of data.

Figure 4:
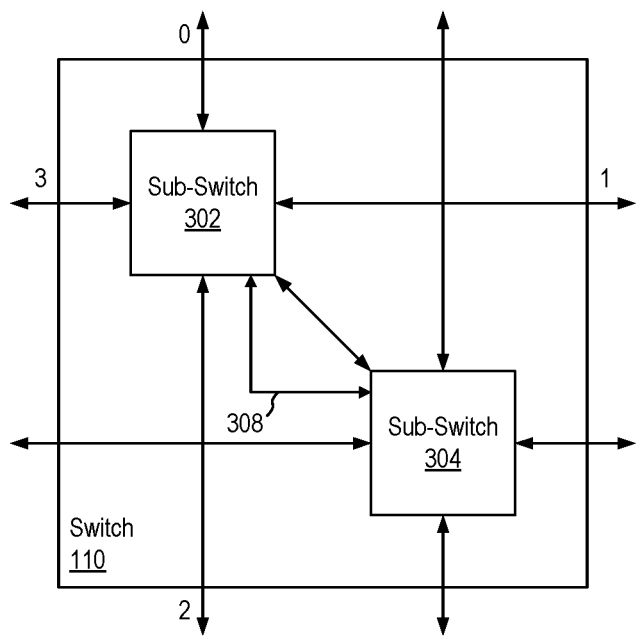
FIG. 4 illustrates another example implementation of a switch of a NoC in accordance with the inventive arrangements described herein.

FIG. 4 illustrates another example implementation of a switch 110 of FIG. 1. The view illustrated in FIG. 4 has been simplified for purposes of illustration. The example of FIG. 4 illustrates switch 110 with ports operating in the second operating mode. In the second operating mode, sub-switches 302, 304 operate in a coordinated manner. Continuing with the example where each of ports 0, 1, 2, 3, 5, 6, 7, and 8 is implemented as a 128-bit port, switch 110 is capable of operating to convey flits of 256-bits in width by treating groups of complementary ports as single, larger ports.

In the example of FIG. 4, where a 256-bit flit is presented to a port 0, 1, 2, or 3 of sub-switch 302, the flit occupies the port to which the flit is presented and the complementary port of sub-switch 304. For example, when a 256-bit flit is presented at port 0, the 256-bit flit will occupy ports 0 and 5, e.g., a group of ports that are complementary that behave as a single, larger port. In this case, port 5 acts, or operates, as a data buffer. For purposes of illustration, consider an example where the 256-bit flit is directed south to ports 2 and 7. This means that an arbitration involving the 256-bit flit may only occur among ports sub-switch 302 and exclude ports of sub-switch 304 as ports 5 and 7, for example, will act as data buffers. Thus, to handle the larger flit size, port 7 does not participate in arbitration when a flit of 256-bits is received and to be routed to the south. As a corollary, switch 110 will only route a 256-bit flit to one of ports 0, 1, 2, or 3. To maintain ordering consistency, a 256-bit read request and/or a 256-bit write response flit is only routed on ports 0, 1, 2, or 3. A 256-bit flit will never be routed on ports 4 or 9.

In one aspect, when operating in the second operating mode, for a selected group of complementary ports of the sub-switch 302 and the sub-switch 304, each port of the selected group is configured to pass a portion of a single flit of data concurrently. For example, consider an example where a 256-bit flit is received by port 0 and is to be routed to port 2. In this example, the selected group of complementary ports is (2, 7) corresponding to the destination ports. In this case, port 2 will pass a first portion of the 256-bit flit (e.g., 128-bits) concurrently with port 7 passing a second portion of the 256-bit flit (e.g., 128-bits) at the same time. Because the two portions of the 256-bit flit are routed together as a single, larger flit, the portions of the 256-bit flit travel together from switch 110 to switch 110 through NoC 100 thereby avoiding the deadlock situation illustrated in FIG. 2.

In another aspect, when operating in the second operating mode, for a selected group of complementary ports of the sub-switch 302 and the sub-switch 304, the port of the selected group from the sub-switch 304 is excluded from arbitration. Referring to the prior example where a 256-bit flit is received at port 0 and is to be routed to port 2, port 7 does not participate in the arbitration. That is, the arbitration is performed only among ports 0, 1, 2, and 3 of sub-switch 302.

In another aspect, in the second operating mode, for a selected group of complementary ports of the sub-switch 302 and the sub-switch 304, in response to a first port of the selected group winning arbitration (e.g., port 0) for a flit of data corresponding to the second width (e.g., 256-bits), the first port (e.g., port 0) passes the flit of data only in response to determining that the second port (e.g., port 7) of the selected group has sufficient credits for transferring the data.

In one or more example implementations, each received flit of data may include a particular bit, e.g., a flag bit. The flag bit indicates whether the flit corresponds to the first width or the second and larger width (e.g., 128-bits and 256-bits in this example). That is, the flag bit specifies the width of the flit of data. The flag bit may be included in the payload portion of the flit. In response to any port referred to as the receiving port on sub-switch 302 receiving a 256-bit flit, as determined by examining the state of the flag bit (e.g., where a set flag bit indicates the second and larger flit width), the complementary port of the receiving port operates in the data buffer mode and does not participate in the arbitration. In the case of a 256-bit flit, for purposes of illustration, the receiving port and the destination port both refer to ports of sub-switch 302. The destination port of sub-switch 302 for the 256-bit flit may only win arbitration when the complementary port in sub-switch 304 of the destination port in sub-switch 302 has sufficient credits to make the data transfer.

In illustration, referring to the prior example where a 256-bit flit is received on port 0 and is to be routed to port 2, the receiving port is port 0 and the destination port is port 2. The complementary port of the receiving port 0 is port 5. Port 5 will, for processing the 256-bit flit, operate in a buffer mode and does not participate in the arbitration. Further, as noted, the destination port 2 wins arbitration for the 256-bit flit only if complementary port 7 for the destination port has sufficient credits to make the data transfer. Further, when a destination port wins arbitration for a 256-bit flit, the complementary port of the winning destination port may not win arbitration for a 128-bit flit. Thus, in the case where destination port 2 wins arbitration for a 256-bit flit of data, complementary port 7 will not win arbitration for a 128-bit flit of data.

Figure 5:
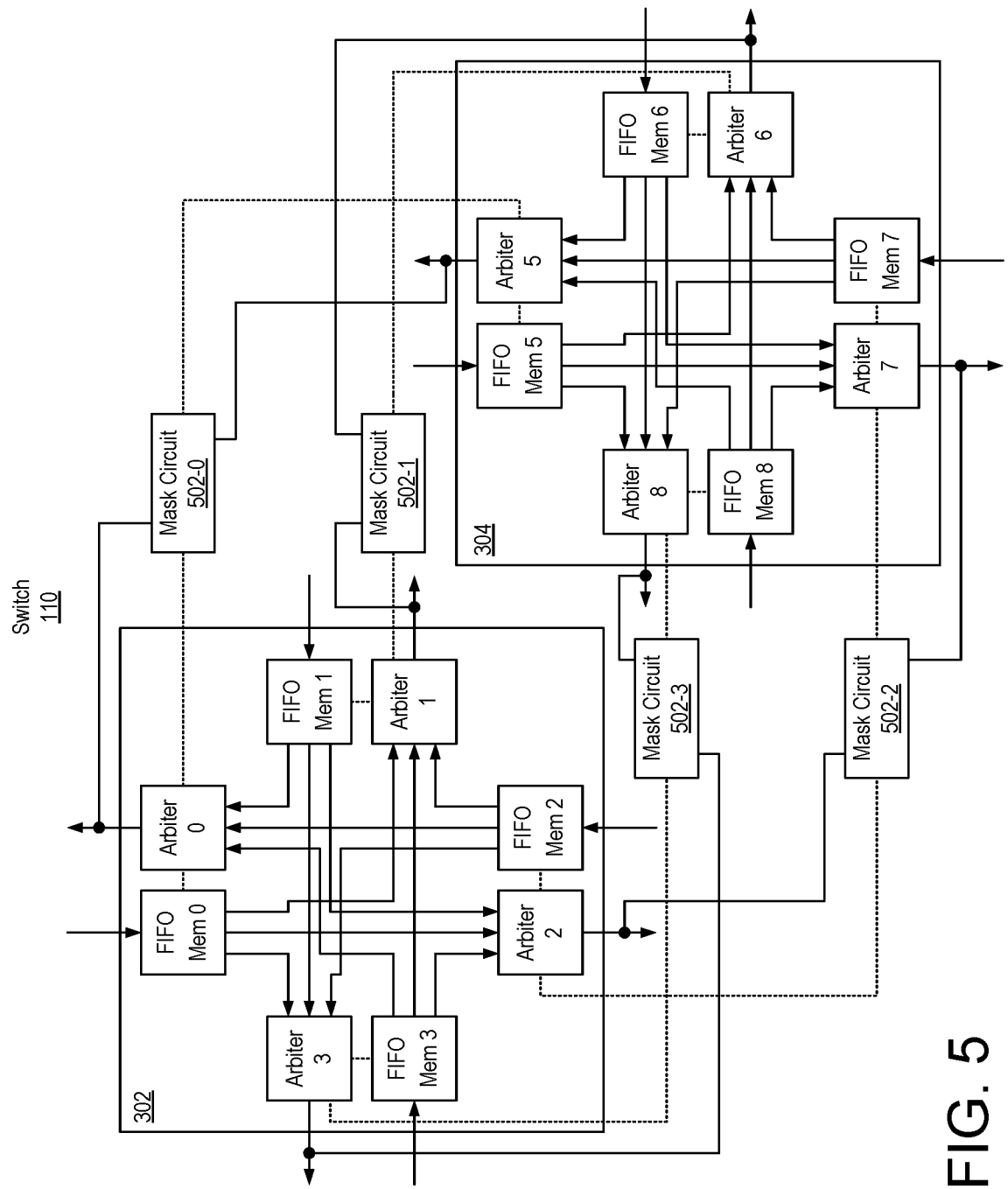
FIG. 5 illustrates another example implementation of a switch of a NoC in accordance with the inventive arrangements described herein.

FIG. 5 illustrates another example implementation of switch 110 of FIG. 1. In the example, sub-switches 302 and 304 are shown in greater detail. In the example, each of ports 0, 1, 2, 3, 5, 6, 7, and 8 includes an arbiter through which data is output from the sub-switch and a FIFO memory (displayed as "FIFO mem") through which data is received into the sub-switch. In the example of FIG. 5, each FIFO memory has an output connected to each arbiter in the same sub-switch having a different port number. That is, FIFO memory 0 is connected to arbiters 1, 2, and 3. FIFO memory 1 is connected to arbiters 0, 2, and 3, and so forth.

In certain respects, the view illustrated in FIG. 5 has been simplified for purposes of illustration. For example, in some example implementations, each port may support multiple virtual channels where each virtual channel is connected to its own FIFO memory. Thus, for example, if port 0 supported 4 virtual channels, port 0 would include 4 FIFO memories 0, e.g., one for each virtual channel. Further, for purposes of illustration, ports 4 and 9 are not shown. It should be appreciated, however, that ports 4 and 9 may be implemented as the other ports where each of ports 4 and 9 includes an arbiter for sending data and a FIFO memory for receiving data.

Each FIFO memory is capable of presenting a request to one arbiter at a time for a valid request received by the port. For example, if the FIFO memory has a valid request at the head of the queue (e.g., each FIFO memory will have at most one valid request at the head of the queue), the FIFO memory presents that request to the particular arbiter (e.g., one arbiter) to which the request is directed. A request to forward data from FIFO memory 0 to port 2 will cause FIFO memory 0 to present a request only to arbitrator 2 (e.g., FIFO memory 0 does not submit any request to arbiters 0, 1, 3, or 4).

In the example, connections between sub-switches 302 through mask circuits 502 (e.g., 502-0, 502-1, 502-2, and 502-3) are illustrated. In one aspect, the synchronization channel 308 previously described between sub-switches 302 and 304 may be implemented by the connections shown through the various mask circuits 502. In the example of FIG. 5, the arbiters for each group of complementary ports are communicatively linked by a mask circuit 502. For example, arbiter 0 is communicatively linked to arbiter 5 via mask circuit 502-0. Arbiter 1 is communicatively linked to arbiter 6 via mask circuit 502-1, and so forth.

Each mask circuit 502 is capable of ensuring that the ports of a group of complementary ports operate as described when operating in the first operating mode or the second operating mode. For example, referring to the example where a 256-bit flit is to be output on port 2, mask circuit 502-2 is capable of ensuring that a 128-bit flit is not output on port 7 concurrently with the 256-bit flit from port 2. In one or more example implementations, each mask circuit 502 may be implemented as a 2-port arbiter where both ports are assumed by the mask circuit 502 to have valid transactions. Each mask circuit 502 is capable of deciding which port of the group of complementary ports to choose in the case where both such ports win an arbitration.

In the example of FIG. 5, each mask circuit 502 also may be communicatively linked to the data output of each arbiter to which the mask circuit is coupled by way of control signals. For example, mask circuit 502-0 is coupled to arbiters 0 and 5 by way of control signals (shown using dashed lines) that are used to select which of arbiters 0, 5 wins arbitration in the event that both win when arbiter 0 is to convey a 256-bit flit. Mask circuit 502-0 is also coupled to the data output from each of arbiters 0, 5 for purposes of monitoring the status of the outputs of arbiters 0, 5 and updating any state machine circuitry that may be included in mask circuit 502-0 that tracks arbitration winning ports, tokens and/or credit of ports, and the like.

Figure 6:
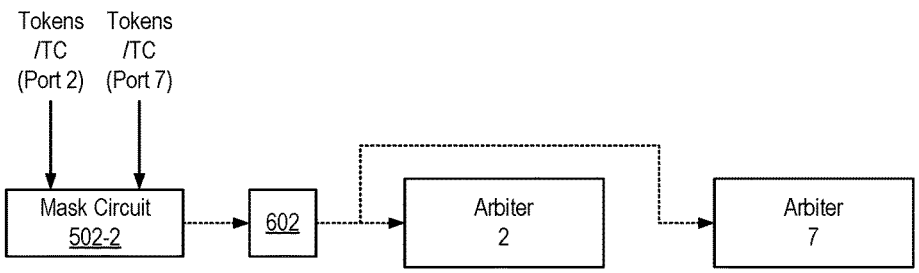
FIG. 6 illustrates certain operational features of mask circuits included in switches of a NoC in accordance with the inventive arrangements described herein.

FIG. 6 illustrates certain aspects of the operation of the mask circuits 502. In the example, mask circuit 502-2 is illustrated. As shown, mask circuit 502-2 is capable of providing a control signal, e.g., one or more mask bits, to each of arbiters 2 and 7. In the example, mask circuit 502-2 couples to each of arbiters 2 and 7 via a register 602. In the example, the inclusion of register 602, e.g., a clocked circuit component, illustrates that the mask circuits 502 do not have to be in the same clock cycle as the arbiters being controlled by the mask circuits. In other words, the calculation performed by mask circuits 502 to perform arbitration among the arbiters of each group of complementary ports may be a separate calculation.

In one or more examples, the mask circuits 502 are capable of performing calculations using data from a prior clock cycle to determine an action to be taken on a next clock cycle. The addition of clocked register 602 facilitates the performance of a larger number of computations by mask circuit 502. This also results in a one clock cycle delay for routing data through switch 110.

In the example where port 2 is to output a 256-bit flit and port 7 also is to output a 128-bit flit, mask circuit 502-2 is capable of selecting port 2. For example, mask circuit 502-2 is capable of outputting a 0 value via the control signal to award arbitration or select port 2, or outputting a 1 value via the control signal to award arbitration or select port 7. Referring again to the example, the control signal (e.g., mask bits) from mask circuit 502-2 may be used as follows:

If port 2 is not a winner of arbitration for the 256-bit flit, the mask bits are ignored.

Else if port 7 is not a winner, the mask bits are ignored.

Else if the mask bit is set to 1, the grant goes to port 7, else the grant goes to port 2.

In one or more examples, each mask circuit 502 may operate as a registered late select. In a fall-through case (when the port arbiters are bypassed), the overhead is limited to that of a two-to-one multiplexer. For example, to ensure that a user circuit design is able to operate at a high clock rate, the mask circuitry is designed to utilize an entire clock cycle. Accordingly, the output of the mask circuits 502 is fed to register 602 and read in the next clock cycle. In some cases, where the switch has one data flow for a given clock cycle, the switch does not require any arbitration. In such cases, the overhead that is incurred to route data using mask circuits 502 corresponds to that of a multiplexer, e.g., a clock cycle.

Figure 7:
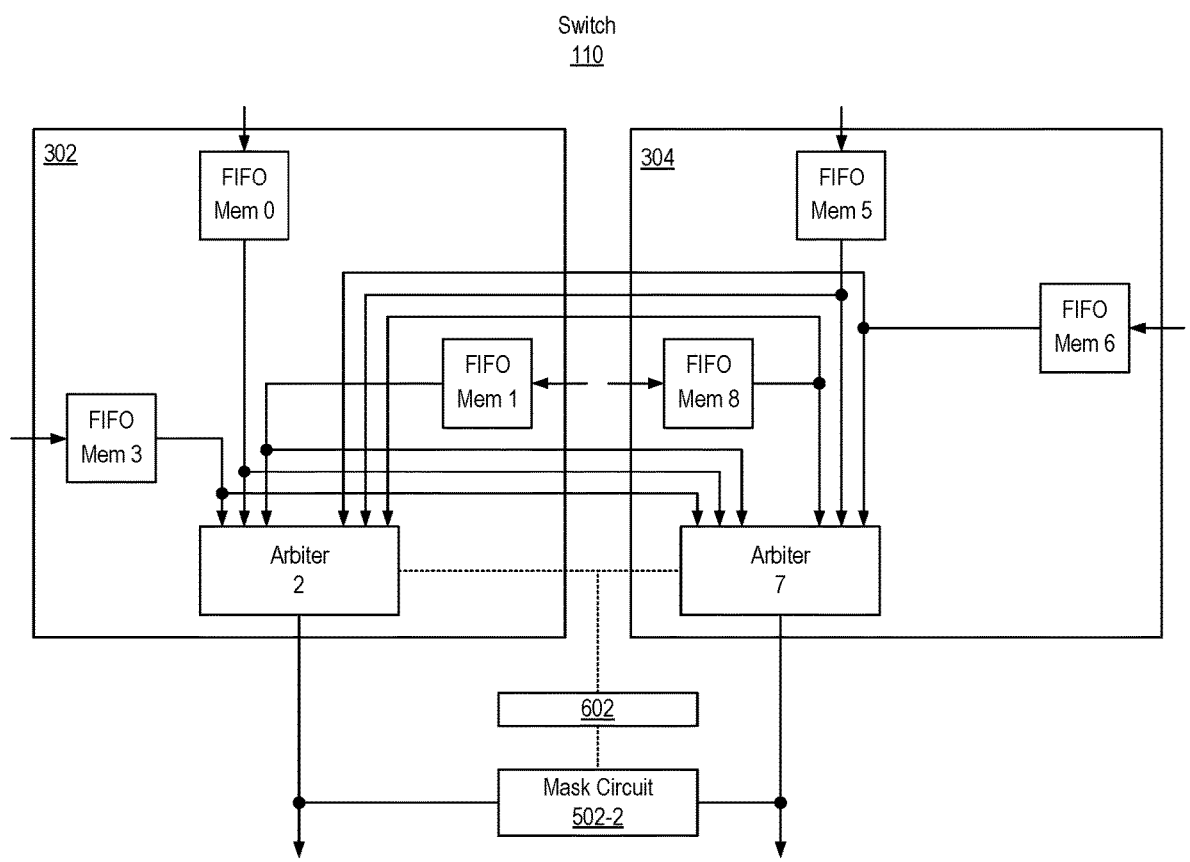
FIG. 7 illustrates an example of the connectivity of a mask circuit with respect to arbiters in the switch of a NoC in accordance with the inventive arrangements described herein.

As illustrated, mask circuit 502-2 may receive input signals specifying tokens and/or transaction credit (TC) usage by each of the ports being arbitrated (e.g., ports 2 and 7 in this example). FIG. 7 below illustrates an example of the connectivity of the mask circuit 502-2 to each of the data outputs of arbiters 2 and 7. In one aspect, each mask circuit 502 may implement a state machine that is capable of tracking token and credit usage by the ports arbitrated by the mask circuit 502. In the example, mask circuit 502-2 implements a state machine that is capable of tracking token and transaction credit usage of ports 2 and 7 based on the data and/or other information (e.g., traffic class, virtual channel, other control signal information) output from each of arbiters 2 and 7.

For example, in response to the selection of a winner from port 2 or port 7, the state machine of mask circuit 502-2 is updated. The information noted above (e.g., data, traffic class, virtual channel, and/or other control signal information) may be fed into mask circuit 502-2 via the inputs illustrated in FIGS. 6 and 7. Mask circuit 502-2 is capable of maintaining tokens for ports 2 and 7 and tracking token (e.g., transaction credit) availability for each of the two ports. As such, mask circuit 502-2 is capable of performing tokenization of QoS to select the next arbitration winner.

In one aspect, mask circuits 502 may be configured to perform a relatively simple arbitration that takes turns between arbiters of groups of complementary ports every clock cycle. In other examples, the arbitration may be more complex where the mask circuits 502 collect tokens from each port of the group of complementary ports and continue selecting one of the ports as the arbitration winner until the tokens of that port are exhausted, at which time the mask circuit 502 begins selecting the other port of group of complementary ports until the tokens of that port are exhausted, and so forth.

Still, the example arbitration schemes presented herein are provided for purposes of illustration and are not intended as limitations of the inventive arrangements described. More or less complex arbitration schemes may be used that may or may not utilize transaction credit and/or tokenization of QoS.

FIG. 7 illustrates another example implementation of switch 110 of FIG. 1. In the example of FIG. 7, the arbiters 0, 1, 3, 5, 6, and 8 and FIFO memories 2 and 7 have been removed for ease of illustration. FIG. 7 illustrates an example implementation where the FIFO memories in each sub-switch are coupled to the arbiters in the same sub-switch (e.g., each arbiter having a port number that is different from the FIFO memory) as previously described, and are also coupled to the arbiter of the complementary port in the other sub-switch.

The example of FIG. 7 is intended to illustrate connectivity only for arbiters 2 and 7. That is, FIFO memory 0, 1, 3, 5, 6, and 8 are coupled to arbiter 2 and also to arbiter 7. In a full view of the switch 110 of FIG. 7, though not shown, FIFO memory 0 and FIFO memory 5 each would be connected to arbiters 1, 2, 3, 6, 7, and 8. FIFO memory 1 and FIFO memory 6 each would be connected to arbiters 0, 2, 3, 5, 7, and 8, and so forth. Neither FIFO memory 0 nor FIFO memory 5 is coupled to arbiter 0 or arbiter 5 (where port 5 is the complementary port of port 0). Similarly, neither FIFO memory 1 nor FIFO memory 6 is coupled to arbiter 1 or to arbiter 6 (where port 6 is the complementary port of port 1), and so forth.

The connectivity described with reference to FIG. 7 allows a 128-bit flit of data to be received into one sub-switch of switch 110 and output via the other sub-switch of switch 110. The example of FIG. 7 may be used to convey a flit of data from one sub-switch to another within the same switch. As also described, ports 4 and 9 may be used to convey a flit of data from one sub-switch to another. The example of FIG. 7 also illustrates the case where mask circuits 502 may provide the control signal through a register 602 to the respective arbiters.

In one or more example implementations, in terms of QoS, for each 256-bit flit, the corresponding token value may be updated by two (e.g., as opposed to one in the case of a 128-bit flit) so that the 128-bit and 256-bit have the same definition of a QoS token.

In one aspect, each 128-bit flit may be implemented as is the case for a conventional 128-bit NoC implementation with the exception that an additional flag bit, as previously discussed, is added to indicate whether the flit is 128-bits or 256-bits in width. Table 1 illustrates an example of a data structure that may be used to implement a 256-bit flit for a write transaction.

TABLE 1

| Blank (42-bits) | Data (256-bits) | Control (8-bits) | Strobe (32-bits) | Flag (1-bit) | Control (26-bits) |
|---|---|---|---|---|---|

Table 2 illustrates an example of a data structure that may be used to implement a 256-bit flit for a read transaction (e.g., a read response).

TABLE 2

| Blank (42-bits) | Data (256-bits) | Control (40-bits) | Flag (1-bit) | Control (26-bits) |
|---|---|---|---|---|

Referring to the examples of Tables 1 and 2, for a 256-bit flit, the NoC packet protocol may utilize two 128-bit ports providing a total of 365 available bits (where this example considers the 256 bits of data and additional control bits). In the example, only 323 bits are usable. The remaining 42 bits may be left blank or reserved. The example data structures of Tables 1 and 2 also illustrate that the flag bit may be included in a payload portion of a flit. For a 128-bit flit, the flag bit may also be included in the payload portion of the flit.

Figure 8:
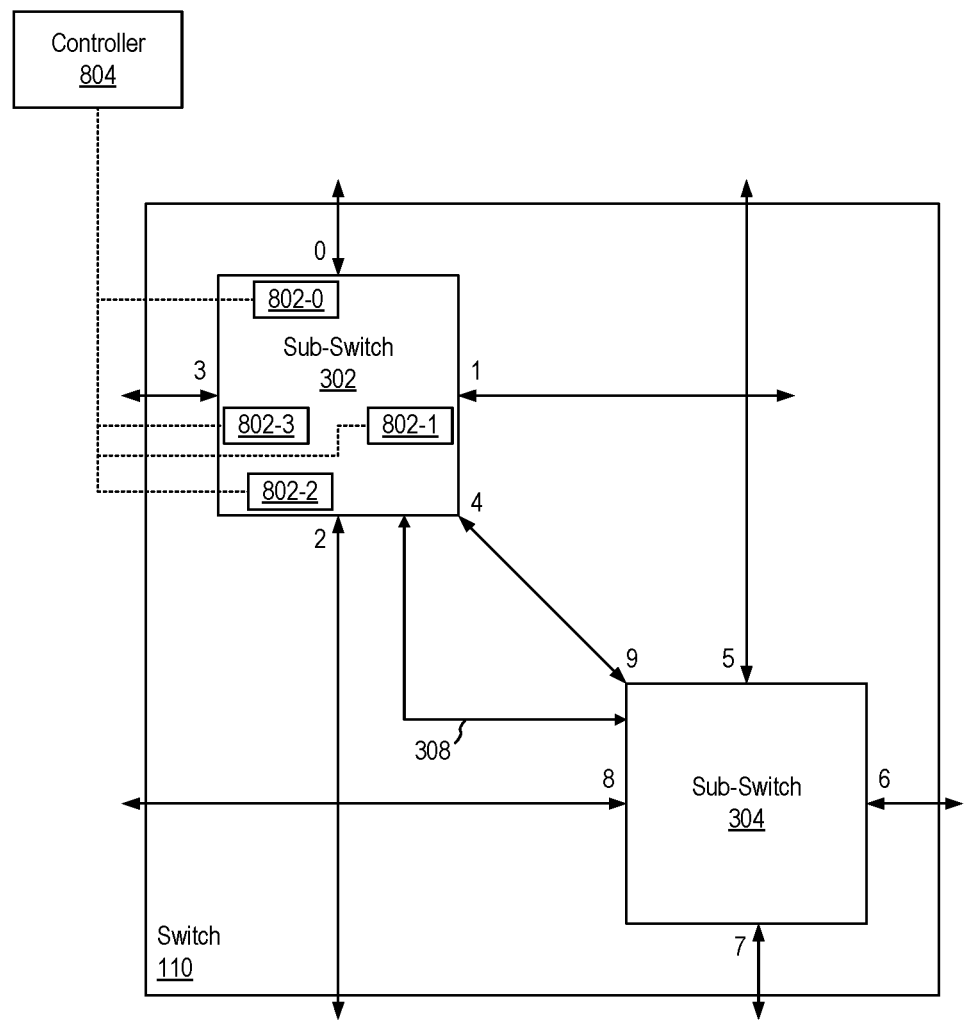
FIG. 8 illustrates another example implementation of a switch of a NoC in accordance with the inventive arrangements described herein.

FIG. 8 illustrates another example implementation of switch 110. In the example of FIG. 8, sub-switch 302 includes configuration registers 802 (e.g., 802-0, 802-1, 802-2, and 802-3) corresponding to ports 0, 1, 2, and 3. Each control register 802 is capable of controlling the corresponding port. For example, control register 802-0 may control port 0. In the example of FIG. 8, the value written to each control register 802 determines whether the port is to handle a 128-bit flit or a 256-bit flit. The example of FIG. 8 does not require the inclusion of a flag bit within the flit itself to indicate the width of the flit. Rather, a controller may be used to program values into configuration registers 802 to specify whether a given port is to operate in the first operating mode or the second operating mode.

For example, programming configuration register 802-0 for the first operating mode allows ports 0 and 5 to operate independently each capable of conveying 128-bit flits independently of the other. Programming configuration register 802-0 for the second operating mode causes ports 0 and 5 to operate cooperatively to send/receive 256-bit flits.

In one aspect, the configuration registers 802 may be programmed prior to runtime of the NoC 100 where different sets of ports of sub-switches 302, 304 are programmed to operate in a selected mode. As discussed, some ports of sub-switch 302 may be programmed to operate in the first operating mode while others are programmed to operate in the second operating mode. In another aspect, the controller 804 is capable of continually programming configuration registers 802 during operation to change the operating mode used by ports of sub-switches 302, 304 during runtime or operation of NoC 100.

Figure 9:
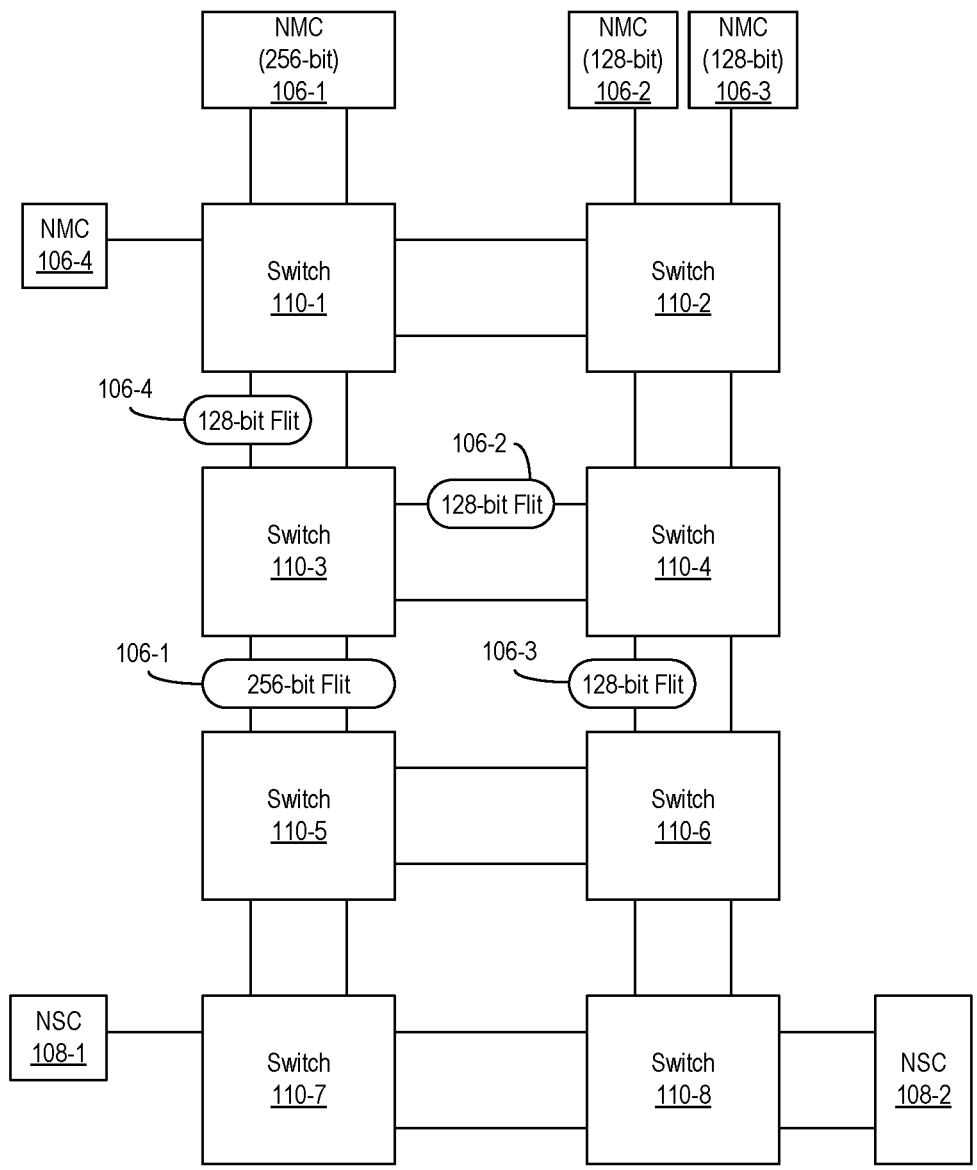
FIG. 9 illustrates another example implementation of a NoC.

FIG. 9 illustrates another example implementation of NoC 100. In the example, NoC 100 includes one or more NMCs 106 that are implemented as 128-bit NMCs having a single 128-bit port and one or more NMCs 106 that are implemented as 256-bit NMCs having two 128-bit ports. In the example of FIG. 8, NMC 106-1 is a 256-bit NMC, while NMCs 106-2, 106-3, and 106-4 are 128-bit NMCs. NoC 100 includes one or more NSCs 108 that are implemented as 128-bit NSCs having a single 128-bit port and one or more NSCs 108 that are implemented as 256-bit NSCs having two 128-bit ports. In the example of FIG. 9, NSC 108-1 is implemented as a 128-bit NSC while NSC 108-2 is implemented as a 256-bit NSC.

A 256-bit NMC 106 is capable of receiving a transaction from an endpoint circuit 102 (not shown) specifying a destination identifier (ID). The destination ID indicates whether the target (e.g., an NSC 108 to which the transaction is to be directed) is a 256-bit NSC or a 128-bit NSC. In response to determining that the target is a 128-bit NSC 108, the 256-bit NMC creates 128-bit flits of data formatted according to a packet protocol used by the NoC (e.g., an NoC packet protocol or NPP). The 128-bit flits, for a given packet of data, are forwarded from the NMC to a same port of a switch connected thereto. The 128-bit flits may be sent to the switch sequentially. That is, the NMC may forward the 128-bit flits of the same packet to the same port of a switch connected thereto thereby avoiding the potential deadlock condition illustrated in FIG. 2.

In response to determining that the target is a 256-bit NSC 108, the 256-bit NMC 106 is capable of creating 256-bit flits of data. The 256-bit NMCs 106 may be updated so that the number of flits sent out is dependent on whether the flit(s) sent are 256-bits or 128-bits wide. That is, the number of 128-bit flits sent by a 256-bit NMC 106 will be double the number of 256-bit flits sent out.

It should be appreciated that the 256-bit NMC is capable of sending two 128-bit flits concurrently in cases where the two 128-bit flits correspond to different packets. Each of the 128-bit flits sent concurrently may be sent to a different port of the switch 110 connected thereto (e.g., a 128-bit flit to each of the complementary ports). As such, the 256-bit NMC 106 does not need any special arbiters for handling two concurrent flits.

In the example of FIG. 9, a 256-bit NSC 108 is capable of receiving data from an endpoint circuit 104 (not shown) specifying a source ID. The source ID indicates whether the target (e.g., an NMC 106 to which the response is to be directed) is a 256-bit NMC or a 128-bit NMC. In response to determining that the target is a 128-bit NMC, the 256-bit NSC 108 is capable of creating 128-bit flits of data. In response to determining that the target is a 256-bit NMC, the 256-bit NSC is capable of creating 256-bit flits of data. The 256-bit NSCs 108 may be updated so that the number of flits sent out is dependent on whether the flit is 256-bits or 128-bits wide. That is, the 256-bit NSC 108 may send out two 128-bit flits or one 256-bit flit.

The 256-bit NSC 108 may include two ports, each capable of processing 128-bits of data. A 256-bit NSC 108 is capable of accepting a single 256-bit flit or two 128-bit flits concurrently (e.g., where the two concurrently 128-bit flits are of different packets). In the example of FIG. 9, when two 128-bit flits are presented, any flits received through ports 0, 1, 2, or 3 of the connected switch 110 are routed to the first port of the 256-bit NSC 108 while any flits received from ports 5, 6, 7, or 8 of the connected switch 110 are routed to the second port of the 256-bit NSC 108. As a result, the 256-bit NSC 108 does not need any special arbiters for handling two concurrent flits.

The 256-bit NSC 108 is also capable of sending data to an NMC and generating flit sizes based on the size of the receiving NMC. That is, in response to determining that the destination of the data is a 128-bit NMC, the 256-bit NSC 108 generates flits of 128-bits (e.g., for a given packet) that are output to the same port of a switch connected thereto. The flits may be output sequentially to the port. In response to determining that the destination of the data is a 256-bit NMC, the 256-bit NSC 108 generates 256-bit flits.

The example of FIG. 9 illustrates that NoC 100 may route both 128-bit and 256-bit flits therein concurrently. The example illustrates the state of NoC 100 as both types of flits are routed from one switch 110 to another. The source of each flit, e.g., the particular NMC 106 from which the flit entered NoC 100, is indicated. In the example of FIG. 8, each 128-bit flit traverses a single port corresponding to a single sub-switch of each switch 110. Each 256-bit flit traverses a pair (or group) of complementary ports of both sub-switches of each switch 110 concurrently where each group of complementary ports behaves as a single, larger port.

Figure 10:
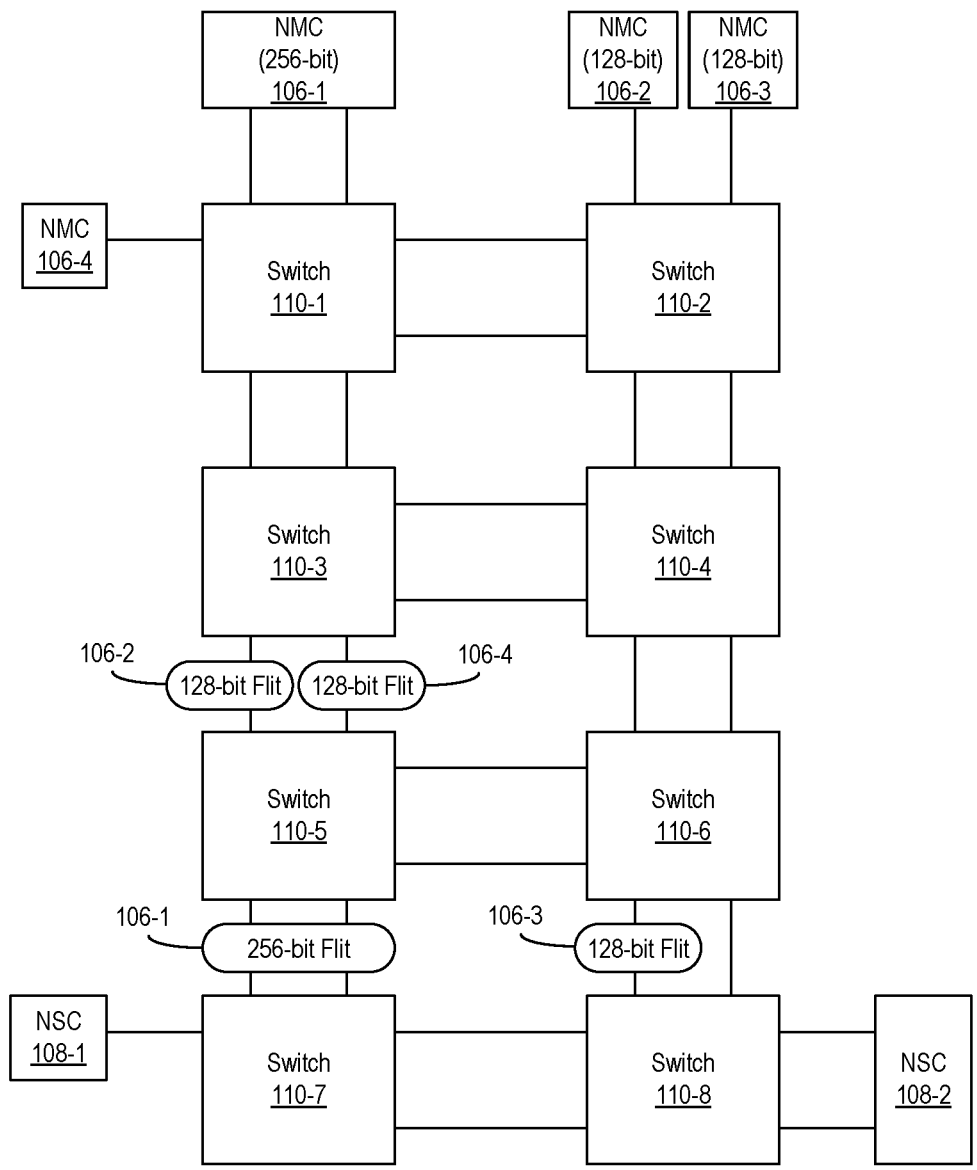
FIG. 10 illustrates another example implementation of a NoC.

FIG. 10 illustrates another example implementation of a NoC 100. The example of FIG. 10 is substantially similar to the example of FIG. 9 albeit showing different locations and routing for the respective 128-bit and 256-bit flits contained therein.

Figure 11:
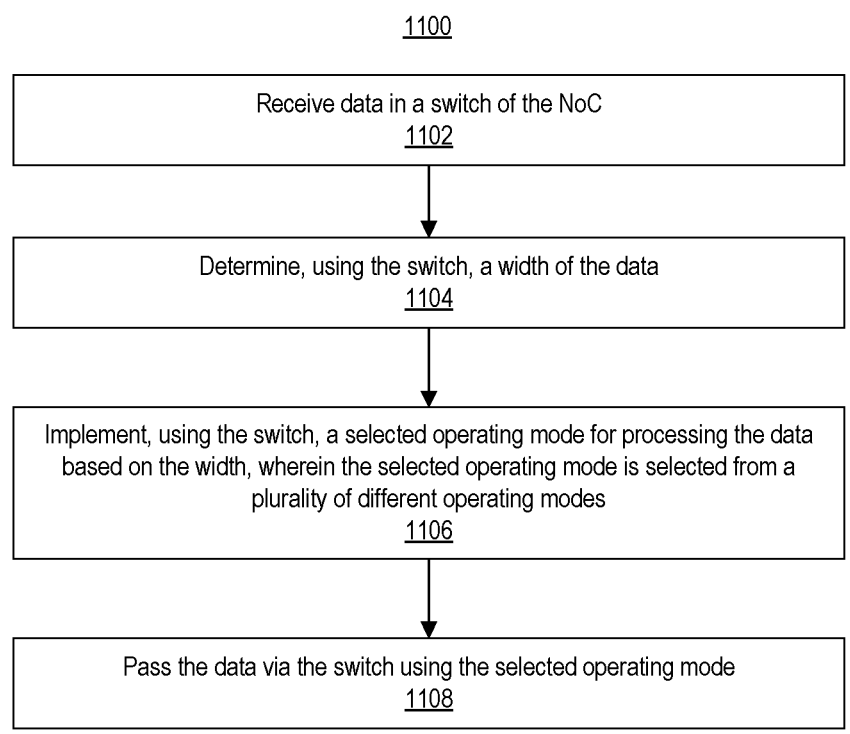
FIG. 11 illustrates an example method of processing data using a switch of a NoC as described within this disclosure.

FIG. 11 illustrates an example method 1100 of processing data using a switch 110 of a NoC 100 as described within this disclosure.

In block 1102, a switch 110 of NoC 100 receives data. In block 1104, the switch 110 determines a width of the data. In block 1106, the switch implements a selected operating mode for processing the data based on the width. The selected operating mode is selected from a plurality of different operating modes. In block 1108, the switch 110 passes the data using the selected operating mode.

The foregoing and other implementations can each optionally include one or more of the following features, alone or in combination. Some example implementations include all the following features in combination.

In one aspect, each operating mode may correspond to one of the possible widths of the data. As discussed, the different operating modes may be applied independently to the different groups of complementary ports of the switch 110. That is, complimentary ports 2 and 7 may implement a first operating mode while complimentary ports 1 and 6 implement a second operating mode.

As noted, the data may include, or be formed of, one or more flits. The switch 110 is capable of implementing the selected operating mode based on widths of the one or more flits on a per-flit basis.

In another aspect, determining the width of the data includes determining a state of a flag contained in each of the one or more flits. For example, the particular sub-switch 302, 304 that receives the data, e.g., a flit of data, is capable of evaluating the flag bit of the flit to determine whether the flit is of a first width or a second width. For purposes of illustration, the first width may be 128-bits while the second width is 256-bits. The state of the flag bit indicates the width of the data.

In another aspect, determining the width of the data includes programming one or more registers included in the switch. A state of the one or more registers, as programmed, indicates the width of the data and specifies the selected operating mode for one or more ports of the switch.

In one aspect, the switch 110 includes a sub-switch 302 and a sub-switch 304 coupled to the sub-switch 302 by a synchronization channel. In that case, the switch is capable of processing flits of data by operating in a first operating mode of the plurality of operating modes in which ports of one or more groups of complementary ports of the first sub-switch and the second sub-switch operate independently.

In another aspect, the first flit of data has a first width corresponding to either a width of the sub-switch 302 or a width of the sub-switch 304.

In another aspect, in the first operating mode, for a selected group of complementary ports, each port of the selected group of complementary ports is configured to pass a flit of data.

In an example, the first operating mode, for a selected group of complementary ports of the sub-switch 302 and the sub-switch 304, only one port of the selected group passes the first flit of data while the other port of the selected group does not concurrently pass another flit of data.

In another example, in the first operating mode, for a selected group of complementary ports of the sub-switch 302 and the sub-switch 304, a first port of the selected group is configured to pass the first flit of data while a second port of the selected group is configured to pass another flit of data concurrently with the first flit of data. The two flits passed concurrently may be of different packets.

In another aspect, the method includes processing further flits of data by operating in a second operating mode of the plurality of operating modes in which ports of the one or more groups of complementary ports of the first sub-switch and the second sub-switch operate cooperatively to send a flit.

In another aspect, the method includes, for a selected group of complementary ports of the sub-switch 302 and the sub-switch 304, excluding the port of the selected group from the second sub-switch from participating in arbitration.

In another aspect, in the second operating mode, for a selected group of complementary ports of the sub-switch 302 and the sub-switch 304, each port of the selected group of complementary ports is configured to pass a portion of a same flit of data concurrently.

In another aspect, the second flit of data has a width that corresponds to a width of the sub-switch 302 and a width of the sub-switch 304 combined.

Figure 12:
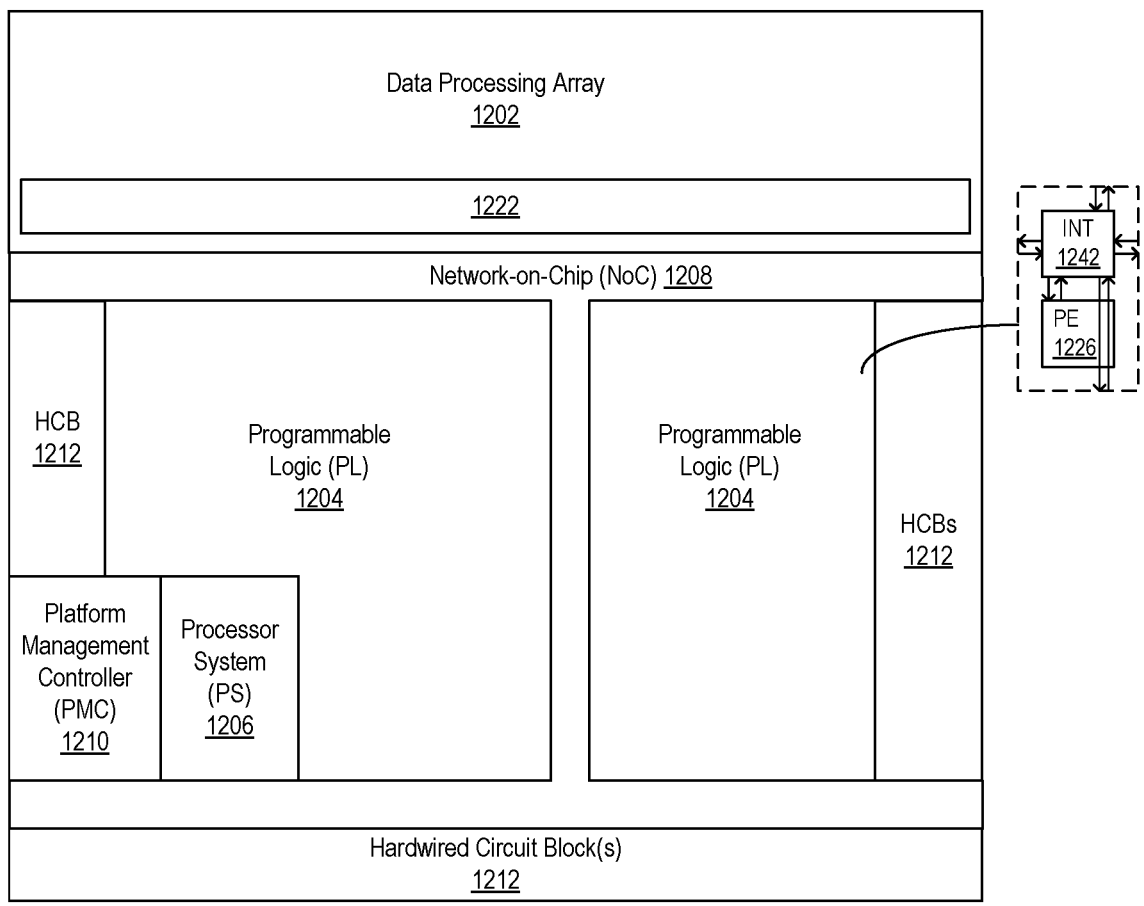
FIG. 12 illustrates an example architecture for an IC including a NoC in accordance with the inventive arrangements described herein.

FIG. 12 illustrates an example architecture 1200 for an IC including a NoC in accordance with the inventive arrangements described herein. Architecture 1200 may be used to implement a programmable IC, an adaptive system, and/or a System-on-Chip (SoC). In the example of FIG. 12, architecture 1200 is implemented on a single die provided within a single package. In other examples, architecture 1200 may be implemented using a plurality of interconnected dies within a single package where the various resources of architecture 1200 (e.g., circuits) illustrated in FIG. 12 are implemented across the different interconnected dies.

In the example, architecture 1200 includes a plurality of different subsystems including a data processing array 1202, programmable logic (PL) 1204, a processor system (PS) 1206, a Network-on-Chip (NoC) 1208, a platform management controller (PMC) 1210, and one or more hardwired circuit blocks 1212. With the exception of the NoC 1208, the various subsystems illustrated in FIG. 12 are provided for purposes of illustration. One or more different subsystems may be omitted and/or other subsystems added.

Data processing array 1202 is implemented as a plurality of interconnected and programmable compute tiles. The compute tiles may be arranged in an array and are hardwired. Each compute tile can include one or more cores and a data memory. In one example implementation, the cores of the compute tiles may be implemented as custom circuits that do not execute program code. In another example implementation, the cores of compute tiles are capable of executing program code stored in core-specific program memories contained within each respective core.

Each compute tile further includes dedicated multi-bit data movement channels connecting the compute tiles. Each compute tile further can include support for direct memory access (DMA) operations and locks to move data to and from data memories of other compute tiles. In one or more other example implementations, data processing array 1202 may include one or more memory tiles that replace one or more of the compute tiles.

Data processing array 1202 includes an interface block 1222 that connects the compute tiles or the memory tiles to other resources of architecture 1200. In the example of FIG. 12, interface block 1222 includes a plurality of interconnected interface tiles organized in a row. In one example, each of the interface tiles may have a same architecture. In another example, the interface tiles may be implemented with different architectures where each different interface tile architecture supports communication with different types of resources of architecture 1200. The interface tiles 1224 are connected so that data may be propagated from one interface tile to another bi-directionally. Each interface tile is capable of operating as an interface for the column of compute tiles and/or memory tiles directly above.

PL 1204 is circuitry that may be programmed to perform specified functions. As an example, PL 1204 may be implemented as field programmable gate array type of circuitry. PL 1204 can include an array of programmable circuit blocks. As defined herein, the term "programmable logic" means circuitry used to build reconfigurable digital circuits. Programmable logic is formed of many programmable circuit blocks that provide basic functionality. The topology of PL 1204 is highly configurable unlike hardwired circuitry. In one aspect, each programmable circuit block of PL 1204 includes a programmable element 1226 (e.g., a functional element) and a programmable interconnect 1242. The programmable interconnects 1242 provide the highly configurable topology of PL 1204. The programmable interconnects 1242 may be configured on a per wire basis to provide connectivity among the programmable elements 1226 of programmable circuit blocks of PL 1204 and is configurable on a per-bit basis (e.g., where each wire conveys a single bit of information) unlike connectivity among the compute tiles and/or the memory tiles in data processing array 1202, for example.

Examples of programmable circuit blocks of PL 1204 include configurable logic blocks having look-up tables and registers. Unlike hardwired circuitry described below and sometimes referred to as hardwired circuit blocks, these programmable circuit blocks have an undefined function at the time of manufacture. PL 1204 may include other types of programmable circuit blocks that also provide basic and defined functionality with more limited programmability. Examples of these circuit blocks may include digital signal processing blocks (DSPs), phase lock loops (PLLs), and block random access memories (BRAMs). These types of programmable circuit blocks, like others in PL 1204, are numerous and intermingled with the other programmable circuit blocks of PL 1204. These circuit blocks may also have an architecture that generally includes a programmable interconnect 1242 and a programmable element 1226 and, as such, are part of the highly configurable topology of PL 1204.

PS 1206 is implemented as hardwired circuitry that is fabricated as part of architecture 1200. PS 1206 may be implemented as, or include, any of a variety of different processor types each capable of executing program code. For example, PS 1206 may be implemented as an individual processor, e.g., a single core capable of executing program code. In another example, PS 1206 may be implemented as a multi-core processor. In still another example, PS 1206 may include one or more cores, modules, co-processors, I/O interfaces, and/or other resources. PS 1206 may be implemented using any of a variety of different types of architectures. Example architectures that may be used to implement PS 1206 may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code.

NoC 1208 is a programmable interconnecting network for sharing data between endpoint circuits in architecture 1200. The endpoint circuits can be disposed in DP array 1202, PL 1204, PS 1206, and/or selected hardwired circuit blocks 1212. NoC 1208 can include high-speed data paths with dedicated switching. In an example, NoC 1208 includes one or more horizontal paths, one or more vertical paths, or both horizontal and vertical path(s). The arrangement and number of regions shown in FIG. 12 is merely an example. NoC 1208 is an example of the common infrastructure that is available within architecture 1200 to connect selected components and/or subsystems.

In the example of FIG. 12, nets that are to be routed through NoC 1208 are unknown until a design is created for implementation within architecture 1200. NoC 1208 may be programmed by loading configuration data into internal configuration registers that define how elements within NoC 1208 such as switches and interfaces are configured and operate to pass data from switch to switch and among the NoC interfaces to connect the endpoint circuits.

In one aspect, NoC 1208 is fabricated as part of architecture 1200 (e.g., is hardwired) and, while not physically modifiable, may be programmed to establish connectivity between different master circuits and different slave circuits of a user circuit design. NoC 1208, upon power-on, does not implement any data paths or routes therein. Once configured by a master circuit such as PMC 1210, however, NoC 1208 implements data paths or routes between endpoint circuits. In one or more example implementations, NoC 1208 may be implemented as described herein in connection with NoC 100.

PMC 1210 is responsible for managing architecture 1200. PMC 1210 is a subsystem within architecture 1200 that is capable of managing the other programmable circuit resources across the entirety of architecture 1200. PMC 1210 is capable of maintaining a safe and secure environment, booting architecture 1200, and managing architecture 1200 during normal operations. For example, PMC 1210 is capable of providing unified and programmable control over power-up, boot/configuration, security, power management, safety monitoring, debugging, and/or error handling for the different subsystems of architecture 1200 (e.g., DP array 1202, PL 1204, PS 1206, and NoC 1208). PMC 1210 operates as a dedicated platform manager that decouples PS 1206 and from PL 1204. As such, PS 1206 and PL 1204 may be managed, configured, and/or powered on and/or off independently of one another.

In one aspect, PMC 1210 is capable of operating as a Root-of-Trust for the entirety of architecture 1200. As an example, PMC 1210 is responsible for authenticating and/or validating device images containing configuration data that may be loaded into architecture 1200 for any of the programmable resources of architecture 1200. PMC 1210 further is capable of protecting architecture 1200 against tampering during operation. By operating as the Root-of-Trust for architecture 1200, PMC 1210 is capable of monitoring operation of PL 1204, PS 1206, and/or any other programmable circuit resources that may be included in architecture 1200. The Root-of-Trust capabilities, as performed by PMC 1210, are distinct and separate from PS 1206 and PL 1204 and/or any operations performed by the PS 1206 and/or PL 1204.

Hardwired circuit blocks 1212 are special-purpose circuit blocks fabricated as part of architecture 1200. Though hardwired, hardwired circuit blocks 1212 may be configured by loading configuration data into control registers to implement one or more different modes of operation. Examples of hardwired circuit blocks 1212 may include input/output (I/O) blocks, transceivers for sending and receiving signals to circuits and/or systems external to architecture 1200, memory controllers, or the like. Examples of different I/O blocks may include single-ended and pseudo differential I/Os. Examples of transceivers may include high-speed differentially clocked transceivers. Other examples of hardwired circuit blocks 1212 include, but are not limited to, cryptographic engines, digital-to-analog converters (DACs), analog-to-digital converters (ADCs), and the like. In general, hardwired circuit blocks 1212 are application-specific circuit blocks.

The various programmable circuit resources illustrated in FIG. 12 may be programmed initially as part of a boot process for architecture 1200. During runtime, the programmable circuit resources may be reconfigured. In one aspect, PMC 1210 is capable of initially configuring DP array 1202, PL 1204, PS 1206, and NoC 1208. At any point during runtime, PMC 1210 may reconfigure all or a portion of architecture 1200. In some cases, PS 1206 may configure and/or reconfigure PL 1204 and/or NoC 1208 once initially configured by PMC 1210. PMC 1210, PS 1206, a hardwired circuit block 1212, and/or a circuit implemented within PL 1204 are examples of a controller such as controller 804 that is capable of controlling the state of control registers 802 of switches 110.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "real-time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The flowchart and block diagrams in the Figures illustrate the architecture, functionality, and operation of possible implementations of systems and methods according to various aspects of the inventive arrangements. In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow.

What is claimed is:

1. An integrated circuit, comprising:
   a Network-on-Chip (NoC) including:
      a plurality of first interface circuits;
      a plurality of second interface circuits; and
      a plurality of switches, wherein the plurality of switches are interconnected and communicatively link the plurality of first interface circuits with the plurality of second interface circuits;
   wherein the plurality of switches are configured to receive data of different widths during operation and implement different operating modes for forwarding the data based on the different widths;
   wherein each switch of the plurality of switches includes a first sub-switch and a second sub-switch coupled to the first sub-switch by a synchronization channel; and
   wherein one or more groups of complementary ports of the first sub-switch and the second sub-switch operate independently in a first operating mode of the different operating modes to convey data of a first width and operate cooperatively as a group in a second operating mode of the different operating modes to convey data of a second width greater than the first width.

2. The integrated circuit of claim 1, wherein
   the data received by the plurality of switches is organized into flits; and
   each switch of the plurality of switches is configured to detect a width of the data based on a flag contained in each flit and implement a selected operating mode selected from the different operating modes based on a state of the flag on a per-flit basis.

3. The integrated circuit of claim 1, wherein, in the first operating mode, for a selected group of complementary ports, each port of the selected group of complementary ports is configured to pass a flit of data.

4. The integrated circuit of claim 1, wherein, in the second operating mode, for a selected group of complementary ports, each port of the selected group is configured to pass a portion of a same flit of data concurrently.

5. The integrated circuit of claim 1, wherein each of the one or more groups of complementary ports is configured to operate in the first operating mode or the second operating mode based on a value stored in a programmable register that controls the group of complementary ports.

6. The integrated circuit of claim 1, wherein the first width corresponds to a width of the first sub-switch and the second width corresponds to a width of the first sub-switch and a width of the second sub-switch combined.

7. The integrated circuit of claim 6, wherein, in the second operating mode, for a selected group of complementary ports, the port of the selected group from the second sub-switch is excluded from arbitration.

8. The integrated circuit of claim 7, wherein
   in the second operating mode, for a selected group of complementary ports, in response to a first port of the selected group of complementary ports winning arbitration for a flit of data, the first port passes the flit of data only in response to determining that a second port of the selected group of complementary ports has sufficient credits for transferring the data.

9. A method of routing data in a Network-on-Chip (NoC), the method comprising:
   receiving data in a switch of the NoC;
   detecting, using the switch, a width of the data;
   implementing, using the switch, a selected operating mode for processing the data based on the width, wherein the selected operating mode is selected from a plurality of different operating modes;
   passing the data via the switch using the selected operating mode, wherein the switch includes a first sub-switch and a second sub-switch coupled to the first sub-switch by a synchronization channel; and
   processing flits of data by operating in a first operating mode of the plurality of different operating modes in which ports of one or more groups of complementary ports of the first sub-switch and the second sub-switch operate independently.

10. The method of claim 9, wherein the data comprises one or more flits and the switch implements the selected operating mode based on widths of the one or more flits on a per-flit basis.

11. The method of claim 10, wherein the detecting the width of the data comprises:
    determining a state of a flag contained in each of the one or more flits.

12. The method of claim 9, wherein the detecting the width of the data comprises:
   programming one or more registers included in the switch, wherein a state of the one or more registers, as programmed, indicates the width of the data and specifies the selected operating mode for one or more ports of the switch.

13. The method of claim 9, wherein, in the first operating mode, for a selected group of complementary ports, each port of the selected group of complementary ports is configured to pass a flit of data.

14. The method of claim 9, further comprising:
   processing further flits of data by operating in a second operating mode of the plurality of different operating modes in which ports of the one or more groups of complementary ports of the first sub-switch and the second sub-switch operate cooperatively to send a flit.

15. The method of claim 14, further comprising:
   for a selected group of complementary ports, excluding the port of the selected group from the second sub-switch from participating in arbitration.

16. The method of claim 14, wherein, in the second operating mode, for a selected group of complementary ports, each port of the selected group is configured to pass a portion of a same flit of data concurrently.

17. The method of claim 16, wherein the further flits of data have a width that corresponds to a width of the first sub-switch and a width of the second sub-switch combined.

* * * * *